US006898994B2

United States Patent
Walton

(10) Patent No.: US 6,898,994 B2
(45) Date of Patent: May 31, 2005

(54) BALL NUT AND SCREW ASSEMBLY

(75) Inventor: Dennis Frederick Walton, North Devon (GB)

(73) Assignee: Thomson Saginaw Ball Screw Company, LLC, Saginaw, MI (US)

( * ) Notice: Subject to any disclaimer, the term of this patent is extended or adjusted under 35 U.S.C. 154(b) by 298 days.

(21) Appl. No.: 10/383,801

(22) Filed: Mar. 7, 2003

(65) Prior Publication Data

US 2003/0145673 A1 Aug. 7, 2003

Related U.S. Application Data

(63) Continuation of application No. 09/798,473, filed on Mar. 2, 2001, now abandoned.

(30) Foreign Application Priority Data

Mar. 3, 2000 (GB) .............................. 0005122

(51) Int. Cl.$^7$ ............................ F16H 1/24; F16H 55/02
(52) U.S. Cl. ................................ 74/424.85; 74/424.87; 74/424.71
(58) Field of Search .................... 74/424.85, 424.82, 74/424.87, 424.71

(56) References Cited

U.S. PATENT DOCUMENTS

| 3,937,097 A | | 2/1976 | Fund et al. | |
|---|---|---|---|---|
| 3,971,264 A | * | 7/1976 | Detraz et al. | 74/424.87 |
| 4,258,584 A | * | 3/1981 | Haegele et al. | 74/424.85 |
| 4,366,723 A | * | 1/1983 | Wilke et al. | 74/89.24 |
| 5,899,114 A | * | 5/1999 | Dolata et al. | 74/424.85 |
| 2004/0093973 A1 | * | 5/2004 | Halasy-Wimmer et al. | 74/424.85 |

FOREIGN PATENT DOCUMENTS

EP 0969228 A2 * 1/2000

* cited by examiner

Primary Examiner—Matthew C. Graham
Assistant Examiner—Melody M. Burch
(74) Attorney, Agent, or Firm—Reising, Ethington, Barnes, Kisselle & Learman, P.C.

(57) ABSTRACT

A ballscrew and ball nut assembly with complimentary threads providing a ball raceway having a ball re-circulation path within the screwshaft of the ballscrew provided on the peripheral surface of a screwshaft insert and including end passages which communicate with the raceway and a non-helical mid-passage connecting said end passages.

3 Claims, 2 Drawing Sheets

BALL NUT AND SCREW ASSEMBLY

The present invention is a continuation of application Ser. No. 09/798,473, filed Mar. 2, 2001, now abandoned, and entitled BALLSCREW, and claims the priority of United Kingdom application 00051227 filed Mar. 3, 2000.

BACKGROUND OF THE INVENTION

Hitherto, ballscrews have been provided with a ball re-circulation path within the ballnut of the ballscrew. The disadvantage of this construction is that the screwshaft needs to be long relative to the ballnut. The present invention seeks to provide a remedy.

SUMMARY OF THE INVENTION

Accordingly, the present invention is directed to a ballscrew having a ball re-circulation path within the screwshaft of the ballscrew. At least a part of the ball re-circulation path is provided by an insert inserted into the screwshaft. In this case, it is advantageous to have an insert which is concentric with the screwshaft.

Deflectors to direct the balls of the ballscrew into the re-circulation path may be in the form of generally circular or part-circular elongate members which engage the screwshaft. These deflectors may take the general form of circlips.

BRIEF DESCRIPTION OF THE DRAWINGS

An example of a ballscrew made in accordance with the present invention is shown in the accompanying drawings, in which.

DETAILED DESCRIPTION OF THE DRAWINGS

Figure 1:
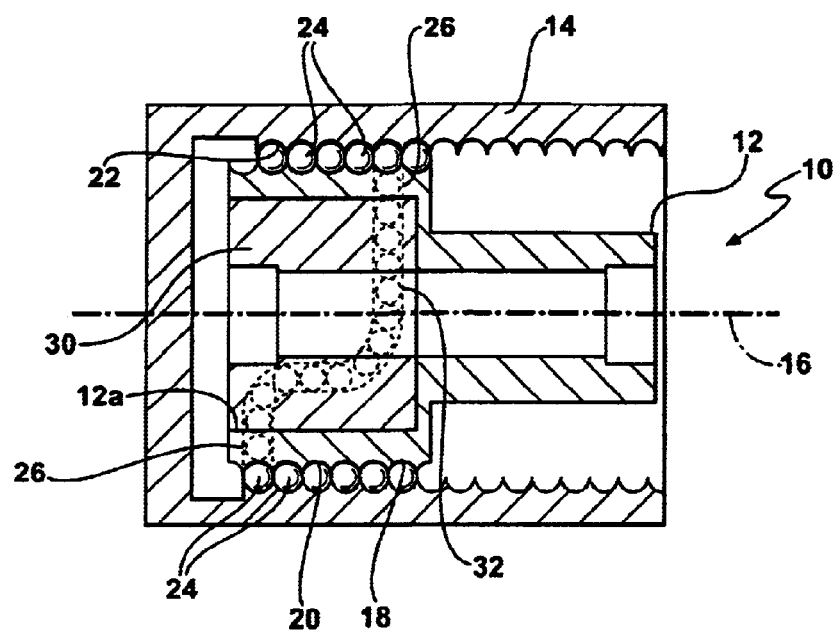
FIG. 1 shows an axial section through such a ballscrew.
Figure 2:
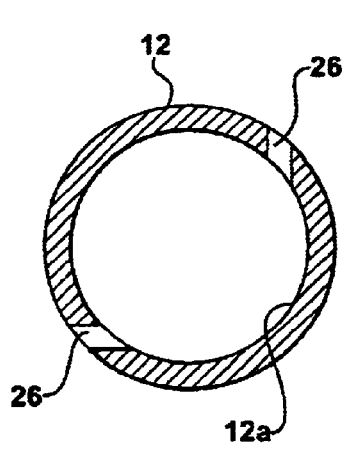
FIG. 2 shows two half cross-sectional views of a screwshaft of a ballscrew shown in FIG. 1.
Figure 3:
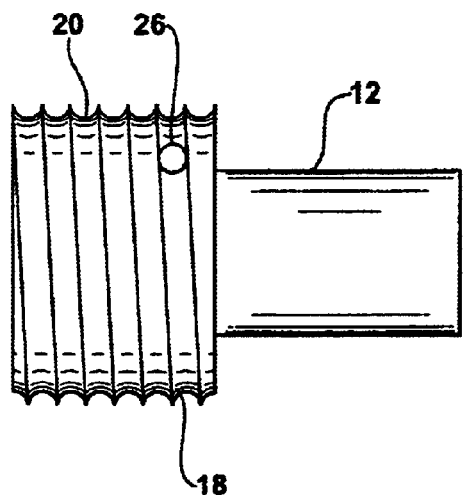
FIG. 3 shows a side view of a screwshaft of the ballscrew shown in FIG. 1.
Figure 4:
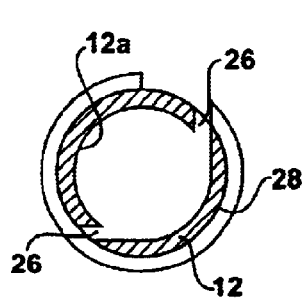
FIG. 4 shows two half cross-sectional views of a screwshaft of a ballscrew shown in FIG. 1 with deflectors.
Figure 5:
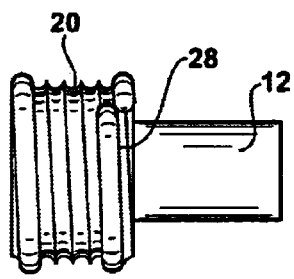
FIG. 5 is a side view of a screwshaft of the ballscrew shown in FIG. 1 with deflectors.
Figure 6:
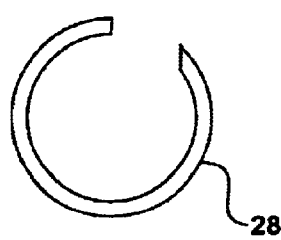
FIG. 6 shows a deflector of the screwshaft shown in FIG. 1, viewing it along a line which passes through the centre of the deflector in a direction generally perpendicular thereto.

In FIGS. 1 to 8, there is shown a ballscrew and ball nut assembly 10 having a screwshaft or ball screw 12 surrounded by a ballnut 14 so that the screwshaft 12 and the ballnut 14 are concentric with one another, sharing a common axis 16 of the ballscrew and ball nut assembly 10. The ball screw 12 has a tubular portion 12a. Around an outer cylindrical surface of the screwshaft 12, there is provided a helical groove 20 providing a groove surface 18. This is in registration with a helical groove 22 formed around he inner cylindrical surface of the ballnut 14 providing a ball nut grooved surface such that the grooves 20 and 22 together define a helical track or raceway for balls 24 of the ball screw and ball nut assembly 10. Two bores or all screw ball transfer openings 26 are formed towards the two ends of the groove 20 of the screwshaft 12, these bores 26 slanting inwardly from the groove 20 to the screwshaft portion 12a interior. Deflectors 28 (shown in FIGS. 4, 5 and 6) are in the form of circlips and can be rotated or snap-fitted into the groove 20 of the screwshaft 12. One end of each circlip 28 has a surface which is on a slant relative to the groove 20 and which is generally flush with an interior surface of the associated bore 26.

Figure 7:
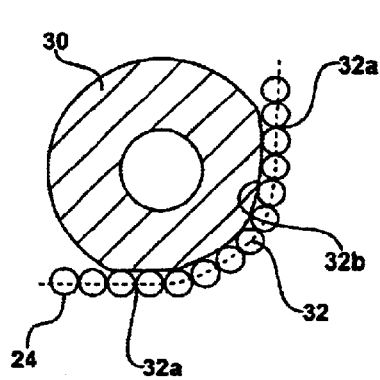
FIG. 7 shows a generally sectional view through an insert located in the screwshaft of the ballscrew shown in FIG. 1.
Figure 8:
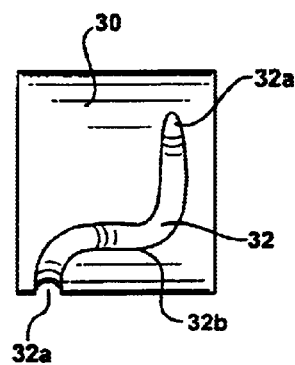
FIG. 8 shows a side view of the insert shown in FIG. 7.

An insert 30 of plastics material is inserted into the screwshaft 12 so as to be coaxial therewith and is formed with a re-circulation path or pathway groove 32 on its external peripheral surface as shown in FIGS. 7 and 8 to transfer balls 24 from one end of the groove 20 to the other end thereof via the screwshaft interior. The recirculation pathway 32 comprises ends or end passages 32a connected by an angular mid-portion or mid-passage 32b. As FIGS. 1 and 7 indicate, the balls are retained or trapped by groove 2.

It will be noted that the axial length of the groove 20 around the outside of the screwshaft 12 is substantially shorter than the axial length of the groove 22 formed around the inside of the ballnut 14.

Modifications in the illustrated construction may occur to the reader without taking the resulting construction outside the scope of the present invention. For example, instead of circlip-type deflectors, there may be provided small hood-like protuberances extending from the groove 20 of the screwshaft 12 at the positions of the bores 26.

I claim:

1. In a ball screw and nut assembly including a ball screw including a tubular portion having an exteriorly helically grooved surface between its opposite ends; a ball nut concentrically encircling said exteriorly helically grooved surface of said ball screw and having a nut interiorly helically grooved surface forming a helical ball raceway with said exteriorly helically grooved surface of said ball screw; and a train of balls within said raceway, an improvement comprising:

a. said ball screw tubular portion having an interior surface radially inwardly of said exteriorly helically grooved surface of said ball screw and radially extending axially spaced ball transfer openings through said tubular portion of said ball screw;

b. an axially extending cylindrical insert with axially spaced ends and an outer peripheral surface disposed concentrically within said tubular portion of said ball screw, said insert having a pair of end passages and a generally axially extending mid-passage connecting with said end passages, said mid-passage having a non-helical shape formed in said peripheral surface of said insert to provide a ball recirculation pathway radially inward of said ball screw ball transfer openings; said end passages and said mid-passage being formed to retain said balls between said interior surface of said tubular portion and said insert.

2. An assembly according to claim 1, having a deflector to direct said balls into said transfer openings and recirculation pathway which is in the form of a generally circular elongate member received in said grooved surface of said ball screw.

3. The assembly of claim 1 wherein said grooved surface of said ball screw and grooved surface of said ball nut have axial lengths and said axial length of said exteriorly helically grooved surface of said ball screw is substantially shorter than said axial length of said nut interiorly helically grooved surface.

* * * * *